(12) United States Patent
Kesavan et al.

(10) Patent No.: US 8,167,097 B2  
(45) Date of Patent: May 1, 2012

(54) FRICTION MATERIAL

(75) Inventors: Sunil K. Kesavan, Farmington Hills, MI (US); Xinming Shao, Novi, MI (US)

(73) Assignee: Akebono Corporation (North America), Elizabethtown, KY (US)

( * ) Notice: Subject to any disclaimer, the term of this patent is extended or adjusted under 35 U.S.C. 154(b) by 746 days.

(21) Appl. No.: 12/208,702

(22) Filed: Sep. 11, 2008

(65) Prior Publication Data

US 2009/0078516 A1 Mar. 26, 2009

Related U.S. Application Data

(60) Provisional application No. 60/973,791, filed on Sep. 20, 2007.

(51) Int. Cl.  
*F16D 69/02* (2006.01)  
*C08J 5/14* (2006.01)

(52) U.S. Cl. ............... 188/251 A; 188/251 R; 523/153

(58) Field of Classification Search ............ 188/251 R, 188/251 A, 251 M; 523/153; 524/443  
See application file for complete search history.

(56) References Cited

U.S. PATENT DOCUMENTS

| | | | |
|---|---|---|---|
| 3,896,075 A * | 7/1975 | Longley | 523/153 |
| 4,351,421 A | 9/1982 | Kurata et al. | |
| 4,465,796 A * | 8/1984 | Leroy et al. | 523/153 |
| 4,605,527 A | 8/1986 | Kamiura et al. | |
| 4,775,705 A | 10/1988 | Parker et al. | |
| 4,918,116 A | 4/1990 | Gardziella et al. | |
| 4,920,159 A * | 4/1990 | Das et al. | 523/153 |
| 5,073,099 A | 12/1991 | Kayano | |
| 5,474,159 A | 12/1995 | Soennecken et al. | |
| 5,516,816 A * | 5/1996 | Samuels | 523/153 |
| 5,539,040 A * | 7/1996 | Rohrmann | 524/425 |
| 5,894,049 A * | 4/1999 | Lamport | 264/258 |
| 6,067,821 A * | 5/2000 | Jackson et al. | 65/482 |
| 6,316,086 B1 | 11/2001 | Beier et al. | |
| 6,481,555 B1 * | 11/2002 | Hell et al. | 188/251 A |
| 6,670,408 B2 | 12/2003 | Hikichi et al. | |
| 2004/0164438 A1 * | 8/2004 | Lamport | 264/86 |

FOREIGN PATENT DOCUMENTS

FR 2844565 A1 * 3/2004

OTHER PUBLICATIONS

Translation of FR 2844565 published Mar. 2004, obtained from EPO website.*

* cited by examiner

*Primary Examiner* — Thomas J Williams  
(74) *Attorney, Agent, or Firm* — Dobrusin & Thennisch PC

(57) ABSTRACT

The present invention is predicated upon friction material and more particularly to chopped basalt reinforcement fibers within a friction material.

20 Claims, 1 Drawing Sheet

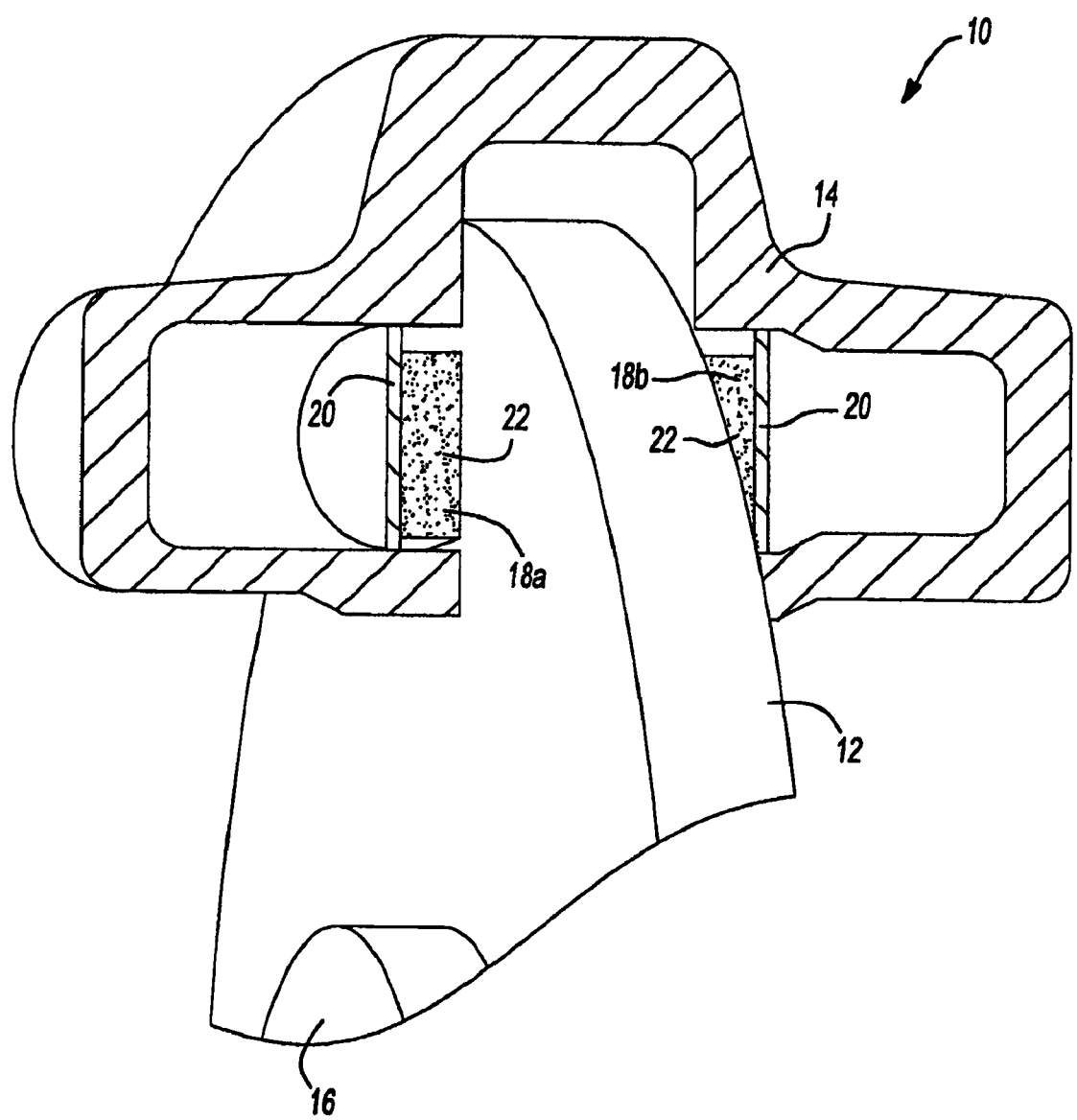

FRICTION MATERIAL

CLAIM OF PRIORITY

The present invention claims the benefit of the priority of the filing date of U.S. Provisional Application Ser. No. 60/973,791 filed Sep. 20, 2007, which is herein incorporated by reference for all purposes.

FIELD OF THE INVENTION

The present invention is predicated upon friction materials and more particularly to reinforcements in a friction material for industrial machines, railway vehicles, baggage cars, passenger cars, freight trucks, the like or otherwise wherein a brake pad, brake lining, clutch facing, or the like is used in the above mentioned applications.

BACKGROUND OF THE INVENTION

Friction materials are often designed based upon criteria put forth by the purchasers or users of the materials. This may take into consideration the required aggressiveness of the material, propensity of the materials to generate unacceptable noise, vibration and harshness (NVH) levels, environmental safety of the material or otherwise. This may also take into consideration the cost and difficulty in designing such materials and the resulting end product thereof, such as brake pads, friction plates or otherwise.

Friction materials use a variety of organic and inorganic fibers for process improvement of the material and to provide thermal and structural reinforcement. Natural or man-made fibers can be linear, amorphous, or fibrillated. Examples of fiber reinforcements include aramid, flax, acrylic, mineral, ceramic, glass, steel, copper, and brass. However, organic fibers, such as aramid and acrylic, provide limited structural reinforcement and thermal resistance. Ceramic fibers while providing good heat resistance are not environmentally desirable. Man-made amorphous biosoluble mineral fibers have thermal resistance, however, they provide only a limited amount of structural and thermal reinforcement resistance due to their morphology. Glass fiber while ideal reinforcement to confer heat resistance to friction material are overly aggressive to the braking mating surfaces (e.g. rotor or drum) and often results in undesirable NVH levels.

The present invention seeks to improve on the available friction materials and methods of forming thereof.

SUMMARY OF THE INVENTION

The present invention provides improved friction material for use in various industries including vehicle, machine or otherwise.

In one aspect, the present invention provides a braking element formed of a friction material. The friction material includes an inorganic reinforcement material comprising chopped basalt fibers. The chopped basalt fibers include a length in the range of about 3 to 13 mm and a diameter in the range of about 5 to 25 microns.

In another aspect, the present invention provides a braking element formed of a friction material, the friction material comprising an inorganic reinforcement material including about 1 to 20% by weight chopped basalt fibers; about 0.5 to 30% by weight one or more additives, the one or more additives include potassium titanate powder, mullite, alumina, or any combination thereof; about 1 to 15% by weight one or more fillers; and one or more binders. The chopped basalt fibers are generally linear fiber strands having an operating temperature in the range of about −250° C. to 700° C.

In another aspect, the present invention provides a method of forming friction material for a brake pad. The method including the steps of providing friction additives, fillers, binders and reinforced fibers, wherein the reinforced fibers comprise chopped basalt fibers. In one preferred configuration, the chopped basalt fibers include a length in the range of about 3 to 13 mm and a diameter in the range of about 5 to 25 microns.

In yet another aspect, any of the aspects of the present invention may be further characterized by one or any combination of the following features: the friction material includes about 1% to about 20% by weight of chopped basalt fibers; the friction material includes about 3% to about 15% by weight of chopped basalt fibers; the friction material includes about 5% to about 12% by weight of chopped basalt fibers; the chopped basalt fibers include a surface treatment for improving adhesion to another material; the surface treatment comprises silane; the chopped basalt fibers include a length in the range of about 1 to 20 mm and a diameter in the range of about 5 to 25 microns; the one or more fillers include barium sulfate, wollastonite, or a combination of both; the one or more binders being present in the amount of about 8 to 12% by weight of the braking element; the friction material includes tin sulfide, antimony sulfide, moly disulfide, tungsten sulfide, or any combination thereof; the step of surface treating comprises silane applied to the basalt fibers before, during, after, or any combinations thereof chopping of the fibers into individual linear strands; or any combination thereof.

It should be appreciated that the above referenced aspects and examples are non-limiting as others exist with the present invention, as shown and described herein. For example, any of the above mentioned aspects or features of the invention may be combined to form other unique configurations, as described herein, demonstrated in the drawings, or otherwise.

BRIEF DESCRIPTION OF THE DRAWINGS

FIG. 1 illustrates a cross-sectional view of a disc brake system.

DETAILED DESCRIPTION

In general, the present invention is predicated upon improved friction materials, and methods of forming thereof. In one preferred configuration, the friction material includes the use of basalt fiber stands as a reinforcement component. More specifically, in one configuration, the present invention is predicated upon the formation of an automotive friction brake pad including a reinforcement material comprising chopped basalt fibers.

Referring to FIG. 1, one simplified configuration of the friction material, brake pad and disc brake assembly of the present invention is shown. The disc brake assembly 10 includes a rotor 12, a caliper 14, and a hub 16. The disc brake system 10 also includes a pair of outboard and inboard brake elements 18a and 18b, respectively, jointly referred herein after as brake elements or pads 18. The brake elements 18 mount to the caliper 14 in a manner known in the art. It will be appreciated that the brake system 10 is shown in a simplified fashion. As such, a more detailed explanation of an exemplary disc brake system is shown in commonly assigned U.S. Pat. No. 4,351,421, the contents of which are hereby incorporated by reference in its entirety for all purposes.

Each of the brake elements 18 includes a structural backing 20 and a friction material 22. The friction material 22 mounts to the structural backing 20 using mechanical fasteners and/or chemical bonding. An example of one such mounting method is disclosed in commonly assigned U.S. Pat. No. 5,073,099, the contents of which are hereby incorporated by reference in its entirety for all purposes.

In operation, the brake elements 18 squeeze against rotor 12 to slow the rotation of the rotor 12 to thereby slow the vehicle (not shown) to a desired speed. As noted above, friction is produced when the brake elements 18 come into contact with the rotor 12; this in turn, causes the brake elements 18 to heat and ultimately wear. It will be appreciated that the above description is also applicable to drum brake configurations, clutch lining configurations and other non-vehicle configurations, for example, slowing machine parts.

The friction material 22 is typically formed of several components including, without limitation, friction additives, fillers, binders and reinforced fibers. These ingredients may be mixed using common friction material mixing techniques. The ingredients may be mixed together in a dry or wet manner and formed (e.g. pressed, molded, the like or otherwise) to generate the friction material of the present invention, as described herein. The percentage and specific configurations of such components may be based upon the application of the friction material and/or required braking or friction characteristics. Also, it is contemplated that other components as well may be used to form the friction material of the present invention, based upon required costs and braking characteristics of the material.

In one particularly preferred configuration, the reinforcing material of the present invention includes basalt fiber and more specifically chopped basalt fiber. It should be appreciated, as discussed herein, that basalt fiber is available in two physical classes, linear fiber strands (e.g. chopped fiber) and amorphous fiber strands (e.g. wool like). Chopped basalt fiber provides improved friction characteristics over the prior art including high heat resistance, moderate hardness, low NVH and other beneficial characteristics.

As mentioned above, basalt fiber is available in several configurations including strands and fibers. While distinction is not always discussed, it should be noted that basalt fibers, particularly chopped basalt fibers have only recently become available to the general public in cost effective commercial quantities.

The chopped basalt fiber comprises a heat resistance material having a higher heat resistance than typical reinforcing fibers or materials. For example, the chopped basalt fiber includes an operating temperature in the range of about −250° C. to 700° C. The chopped basalt fiber also includes a hardness which is not overly aggressive towards a corresponding braking surface (e.g. rotor or drum). For example, the chopped basalt fiber includes a medium hardness of about 6 to 6.5 Mohs. This hardness level not only limits rate at which the corresponding braking surface is warn but also basalt fiber is not inherently hard and does not form angular ground shards such as glass powder.

Chopped basalt fiber is typically formed through an extrusion process. In this process, basalt material, such as basalt rock, is heated to the point of melting and extruded through a die to form elongated linear fibers of basalt, wherein the elongated fibers include a width and thickness. After extrusion, the basalt fibers are chopped to a specified length for use with the friction material of the present invention.

In contrast, basalt wool is not generally linear but instead takes on an amorphous configuration, such as steel wool. Unlike chopped basalt strands, basalt wool does not have a uniform thickness or length. This non-uniform thickness does not have adequate strength for reinforcement of a friction material. Furthermore, the non-uniform thickness does not have sufficient or comparable heat resistance as compared to oriented fiber strands.

Chopped basalt fiber may be formed in desired linear configurations with respect to thickness and length. The basalt linear fiber includes a maximum and minimum diameter based upon the width and thickness of the linear fiber. The diameter range, and hence minimum and maximum of the width and thickness, may be of any suitable configuration based upon specific requirements of the friction material. For example, it is contemplated that the diameter of the linear basalt fiber may be in the range of about 2 to 50 microns, or about 5 to 25 microns, or even in the range of about 10 to 20 microns. However, other configurations are contemplated.

The chopped basalt fiber may also include any suitable length based upon specific requirements of the friction material. For example, it has been discovered that length in the range of about 1 to 20 mm, or about 3 to 13 mm or even about 5 to 10 mm provide advantageous friction qualities. However, other configurations are contemplated.

Optionally, it is contemplated that the chopped basalt fiber may include a surface treatment for improving the adhesion quality of the fiber to a binder component. In one configuration, the surface treatment comprises silanes applied to the basalt fibers before, during or after (or even combinations thereof chopping of the fibers into individual linear strands.

The amount of chopped basalt fiber within the friction material may also vary between applications to achieve a desired friction characteristic. Examples of suitable percentages of chopped basalt fiber within the friction material include the range of about 1 to 20 wt %, about 3 to 15 wt % or about 5 to 12 wt % of the friction material. However, other configurations are contemplated.

The friction material may also include one or more additives combined with the chopped basalt fibers. Such additives may provide heat resistance, hardness, improved friction or other advantageous characteristics to the friction material. Suitable additives includes potassium titanate powder, mullite, alumina, the like or otherwise, or any combination thereof.

The amount of additives within the friction material may also vary between applications. Examples of suitable percentages of additives within the friction material include the range of about 0.5 to 30 wt %, about 1 to 8 wt % or about 5 to 15 wt % of the friction material. However, other configurations are contemplated.

It is further contemplated that the friction material may also include one or more fillers combined with the basalt fibers. Similar to the additives, fillers may provide heat resistance, improve friction or otherwise. Fillers may also be used as a means to reduce the cost of the friction material. Suitable fillers includes barium sulfate, wollastonite, the like or otherwise, or any combination thereof.

The amount of fillers within the friction material may also vary between applications. Examples of suitable percentages of fillers within the friction material include the range of about 1 to 15 wt %, about 5 to 30 wt % or about 8 to 20 wt % of the friction material. However, other configurations are contemplated.

The friction material of the present invention further includes one or more binders for maintaining the ingredients of the friction materials together. The binders may be added as a surface treatment prior to or during mixture of the ingredients forming the friction material. The binder may also be added after forming of the friction material. In one configuration, the binder comprises or includes phenolic resin. Further details as to the use and substitution of phenolic resin is further discussed in commonly assigned U.S. Pat. No. 6,670,408, the contents of which are hereby incorporated by reference in its entirety for all purposes.

It is further contemplated that the binder may comprise or be used in conjunction with one or more surface treatments. For example, with reference to the chopped basalt fibers, the binder may comprise or be used with silanes to provide improved adhesion between components of the friction material.

The amount of binder within the friction material may also vary between applications. Examples of suitable percentages of binder within the friction material include the range of about 7 to 9 wt %, about 10 to 11 wt % or about 8 to 12 wt % of the friction material. However, other configurations are contemplated.

Optionally, the friction material may further comprise one or more lubricants or other ingredients to improve performance of the friction material. For example, lubricants such as tin sulfide, antimony sulfide, moly disulfide and tungsten sulfide, the like or otherwise, or any combination thereof.

In view of the foregoing, it should be appreciated that the present invention provides different potential configurations of friction materials including chopped basalt linearly arranged fibers. Below are specific configurations of friction materials according to the teachings of the present invention.

Table 1 shows a first exemplary composition of the friction material 22 illustrating another embodiment of the present invention. The values found in the column labeled "Exemplary Values" represents preferred values of the components within the friction material.

TABLE 1

| Components of the Friction Material | Exemplary Values (percentage of total weight) |
| --- | --- |
| Phenolic Resin | about 8.5% |
| Rubber dust | about 2% |
| Friction dust | about 5% |
| Tin sulfide | about 4% |
| Molybdenum disulfide | about 2% |
| Iron oxide | about 5% |
| Chopped basalt fiber | about 6% |
| Aramid pulp | about 4% |
| Copper fiber | about 8% |
| Graphite | about 8% |
| Lime | about 3% |
| Vermiculite | about 3% |
| Barium Sulfate | about 20% |
| Potassium titanate powder | about 14% |
| Wollastonite | about 5% |
| Petroleum coke | about 2.5% |

Table 2 shows a second exemplary composition of the friction material 22 illustrating another embodiment of the present invention. Again, the values found in the column labeled "Exemplary Values" represents preferred values of the components within the friction material. It will be appreciated that the values outlined above in Table 1 and below in Table 2 are exemplary values and, as such, do not limit the scope of the present invention.

TABLE 2

| Components of the Friction Material | Exemplary Values (percentage of total weight) |
| --- | --- |
| Phenolic Resin | about 9% |
| Rubber dust | about 4% |
| Friction dust | about 6% |
| Tin sulfide | about 3% |
| Iron oxide | about 5% |
| Titanium dioxide | about 5% |
| Chopped basalt fiber | about 5% |
| Aramid pulp | about 4% |
| Copper fiber | about 9% |
| Graphite | about 7% |
| Lime | about 3% |
| Mica | about 3% |
| Barium sulfate | about 16% |
| Potassium titanate powder | about 17% |
| Petroleum coke | about 4% |

The present invention also contemplates methods of forming a friction material through the use of chopped basalt fiber. The method includes forming basalt fiber through an extrusion process. The extrusion process includes the steps of melting basalt material and extruding the melted basalt through one or more dies to form linearly orientated basalt fibers. The fibers are then chopped to size to form individual strands of linearly orientated chopped basalt fibers.

The method further includes the step of combining the chopped basalt fiber with one or more additional friction material components selected from additives, fillers, binders, combinations thereof or otherwise. The resulting mixture is then pressed and/or molded to form a friction pad and in at least one configuration a friction brake pad for a vehicle. Optionally, during forming, one or more components may be treated with a surface treatment, such as a silane, to improve adhesion of the components during forming the friction material.

The friction material of the present invention may be used in various applications, particularly for braking purposes or load transferring. For example, with respect to braking applications, the friction material may be used to form brake pads for vehicles including, but not limited to, passenger automobiles, freight trucks, motorcycles, railway vehicles, airplanes, bicycles or otherwise. Also, the friction material may also be used as braking material for industrial machines such as cutting devices or otherwise. With respect to load transferring, the friction material may also be used to form friction plates or otherwise for transferring torque between members, such as a clutch plate or otherwise.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. Similarly, specific features or components described in the different embodiments of the friction material may be used with other embodiments or may be combined with yet other features or components to form other embodiments. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A method of forming friction material for a brake pad, the method including the steps of:
   extruding basalt through a die to form linear fiber strands;
   chopping the linear fiber strands of basalt to form individual strands of chopped basalt fiber;
   dry mixing the chopped basalt fiber with one or more of friction additives, fillers and binders to form a friction material mixture; and
   forming the mixture into a pad to form a friction element;
   wherein the chopped basalt fibers include a length in the range of about 3 to 13 mm and a diameter in the range of about 5 to 25 microns.

2. The method of claim 1, wherein the friction element includes about 3% to about 15% by weight of chopped basalt fibers.

3. The method of claim 2, wherein:
   i) the friction element includes about 0.5 to 30% by weight one or more additives, the one or more additives including potassium titanate powder, mullite, alumina, or any combination thereof
   ii) the friction element includes about 1 to 15% by weight one or more fillers, the one or more fillers include barium sulfate, wollastonite, or a combination of both.
   iii) the friction element includes about 8 to 12% by weight one or more binders;
   iv) the chopped basalt fibers include a surface treatment for improving adhesion to another material, the surface treatment having silane.

4. The method of claim 3, wherein the friction material includes about 5% to about 12% by weight of chopped basalt fibers.

5. The method of claim 4, wherein the chopped basalt fibers are generally linear fiber strands having an operating temperature in the range of about −250° C. to 700° C.

6. The method of claim 5, wherein the chopped basalt fibers have a hardness of about 6 Mohs to about 6.5 Mohs.

7. The method of claim 6, wherein basalt rock is heated to the point of melting before the basalt is extruded.

8. The method according to claim 7, wherein the binders are added as a surface treatment prior to or during mixing of the ingredients forming the friction material.

9. The method according to claim 8, wherein the binders comprise a phenolic resin.

10. The method according to claim 9, wherein the friction element includes aramid pulp.

11. The method of claim 1, further comprising the step of surface treating the chopped basalt fiber for improving adhesion to another material.

12. The method of claim 11, wherein the step of surface treating comprises silane applied to the basalt fibers before, during, after, or any combinations thereof chopping of the fibers into individual linear strands.

13. The method of claim 12, wherein basalt rock is heated to the point of melting before the basalt is extruded.

14. The method of claim 1, wherein the friction element includes antimony sulfide, moly disulfide, tungsten sulfide, or any combination thereof.

15. The method of claim 1, wherein the friction material includes about 5% to about 12% by weight of chopped basalt fibers.

16. The method of claim 1, wherein the chopped basalt fibers are generally linear fiber strands having an operating temperature in the range of about −250° C. to 700° C.

17. The method of claim 1, wherein the chopped basalt fibers have a hardness of about 6 Mohs to about 6.5 Mohs.

18. The method of claim 1, wherein basalt rock is heated to the point of melting before the basalt is extruded.

19. The method according to claim 1, wherein the binders are added as a surface treatment prior to or during mixing of the ingredients forming the friction material.

20. The method according to claim 1, wherein the binders comprise a phenolic resin.

* * * * *